United States Patent
Nagase

(10) Patent No.: US 7,905,403 B2
(45) Date of Patent: Mar. 15, 2011

(54) SHEET CONVEYING APPARATUS AND IMAGE FORMING APPARATUS

(75) Inventor: Tetsuya Nagase, Abiko (JP)

(73) Assignee: Canon Kabushiki Kaisha (JP)

( * ) Notice: Subject to any disclaimer, the term of this patent is extended or adjusted under 35 U.S.C. 154(b) by 1324 days.

(21) Appl. No.: 11/398,978

(22) Filed: Apr. 6, 2006

(65) Prior Publication Data
US 2006/0226987 A1 Oct. 12, 2006

(30) Foreign Application Priority Data
Apr. 8, 2005 (JP) .................... 2005-111712

(51) Int. Cl.
*G06K 7/00* (2006.01)
*G06K 7/08* (2006.01)
(52) U.S. Cl. ...................... 235/439; 235/451
(58) Field of Classification Search .......... 235/435, 235/439, 451; 340/572.7
See application file for complete search history.

(56) References Cited

U.S. PATENT DOCUMENTS

| 5,500,651 | A * | 3/1996 | Schuermann | 342/42 |
| 7,088,248 | B2 * | 8/2006 | Forster | 340/572.7 |
| 7,227,469 | B2 * | 6/2007 | Varner et al. | 340/572.1 |
| 7,327,265 | B2 * | 2/2008 | Tsujimura et al. | 340/572.7 |
| 7,551,885 | B2 * | 6/2009 | Yaguchi | 399/368 |
| 2004/0098340 | A1 * | 5/2004 | Schott et al. | 705/45 |
| 2005/0274799 | A1 * | 12/2005 | Torchalski et al. | 235/432 |
| 2006/0244607 | A1 * | 11/2006 | Liu et al. | 340/572.7 |

FOREIGN PATENT DOCUMENTS
JP   2002-337426 A   11/2002
JP   2008137787 A *  6/2008
* cited by examiner

*Primary Examiner* — Jamara A Franklin
(74) *Attorney, Agent, or Firm* — Rossi, Kimms & McDowell LLP

(57) ABSTRACT

The present invention relates to a sheet conveying apparatus comprising a communication device, which performs communications with an RFID tag attached to a sheet material passing through a conveyance path, wherein a maximum communicable distance between the communication device and the RFID tag on the conveyance path is smaller than a sum of an interval between sheet materials to be sequentially conveyed onto the conveyance path and a length of the sheet material in a conveyance direction.

12 Claims, 16 Drawing Sheets

FIG. 6

| Command | | Control contents |
|---|---|---|
| 1 | 0 | Reading |
| 0 | 1 | Writing |

SHEET CONVEYING APPARATUS AND IMAGE FORMING APPARATUS

BACKGROUND OF THE INVENTION

1. Field of the Invention

The present invention relates to a sheet conveying apparatus capable of conveying a sheet material having a Radio Frequency Identification (hereinafter abbreviated as "RFID") tag attached thereto, and an image forming apparatus using the same.

2. Description of the Related Art

There has been proposed a sheet conveying apparatus, in which a sheet material has an RFID tag attached thereto capable of performing transmission or reception via radio communications, and further, there have been disclosed applications for such a sheet conveying apparatus (see, for example, Japanese Patent Application Laid-open (JP-A) No. 2002-337426). An RFID tag has been attached to a sheet material; a reader/writer for the RFID tag has been disposed in an original scanner or a printer; and digital data has been read from or written in the RFID tag of the sheet material.

Japanese Patent Application Laid-open (JP-A) No. 2002-337426)

However, a single reader/writer might accidentally perform communications with respective RFID tags of a plurality of sheet materials in an apparatus, and therefore, data could not be read from or written in only a required sheet material.

In recent years, there has been promoted the miniaturization of an image forming apparatus such as a copying machine, a printer or a facsimile, so that there has been developed an image forming apparatus in which a path from the feeding of a sheet material to the discharge thereof is shortened. In this case, a plurality of sheet materials have been conveyed through adjacent sheet material conveyance paths at the same time, thereby raising a problem of simultaneous detection of the plurality of sheet materials.

In addition, if a metallic portion is formed at a position at which the RFID tags are adjacent to each other, there has been a possibility that the reader/writer cannot perform normal communications. This has been because the RFID tag produces a magnetic field at the metallic portion by a radio wave generated from the reader/writer, thereby causing electromagnetic induction, so as to produce an electric current required for reading or writing data, and further, a metal at the adjacent position also produces a magnetic field, thereby eliminating the magnetic field around the RFID tags. In this case, the RFID tag has hardly caused the electromagnetic induction, thereby raising a problem that the communications with the reader/writer becomes impossible.

Therefore, an object of the present invention is to accurately recognize only an RFID tag attached to a sheet material required for reading or writing by a reader/writer, so as to perform stable communications.

SUMMARY OF THE INVENTION

In order to achieve the above-described object, a typical configuration according to the present invention is featured in that a sheet conveying apparatus includes a communication device, which performs communications with an RFID tag attached to a sheet material, to perform the communications with the RFID tag of the sheet material passing through a conveyance path, wherein a Maximum communicable distance between the communication device on the conveyance path and the RFID tag is smaller than a sum of an interval between sheet materials sequentially conveyed onto the conveyance path and a length of the sheet material in a conveyance direction.

As described above, according to the present invention, the communicable distance in the communication device is designed to be smaller than the sum of the interval of the sheet materials and the length of the sheet material in the conveyance direction. Thus, the RFID tags, each of which is attached to a same position as the sheet material, can be prevented from being communicated by the communication device at the same time. As a consequence, it is possible to accurately recognize only the RFID tag attached to the sheet material required for reading or writing data by the communication device, so as to perform stable communications.

BRIEF DESCRIPTION OF THE DRAWINGS

FIG. 6 is a table illustrating an example of a control mode of the RFID tag;

DETAILED DESCRIPTION OF THE PREFERRED EMBODIMENTS

First Embodiment

A first embodiment according to the present invention will be described in reference to the attached drawings. Detailed descriptions will be given in order of an image formation device, a sheet conveying apparatus, a sheet material, an RFID tag and a reading/writing circuit, and thereafter, a tag recognizer, which is a feature in the present embodiment.

Figure 1:
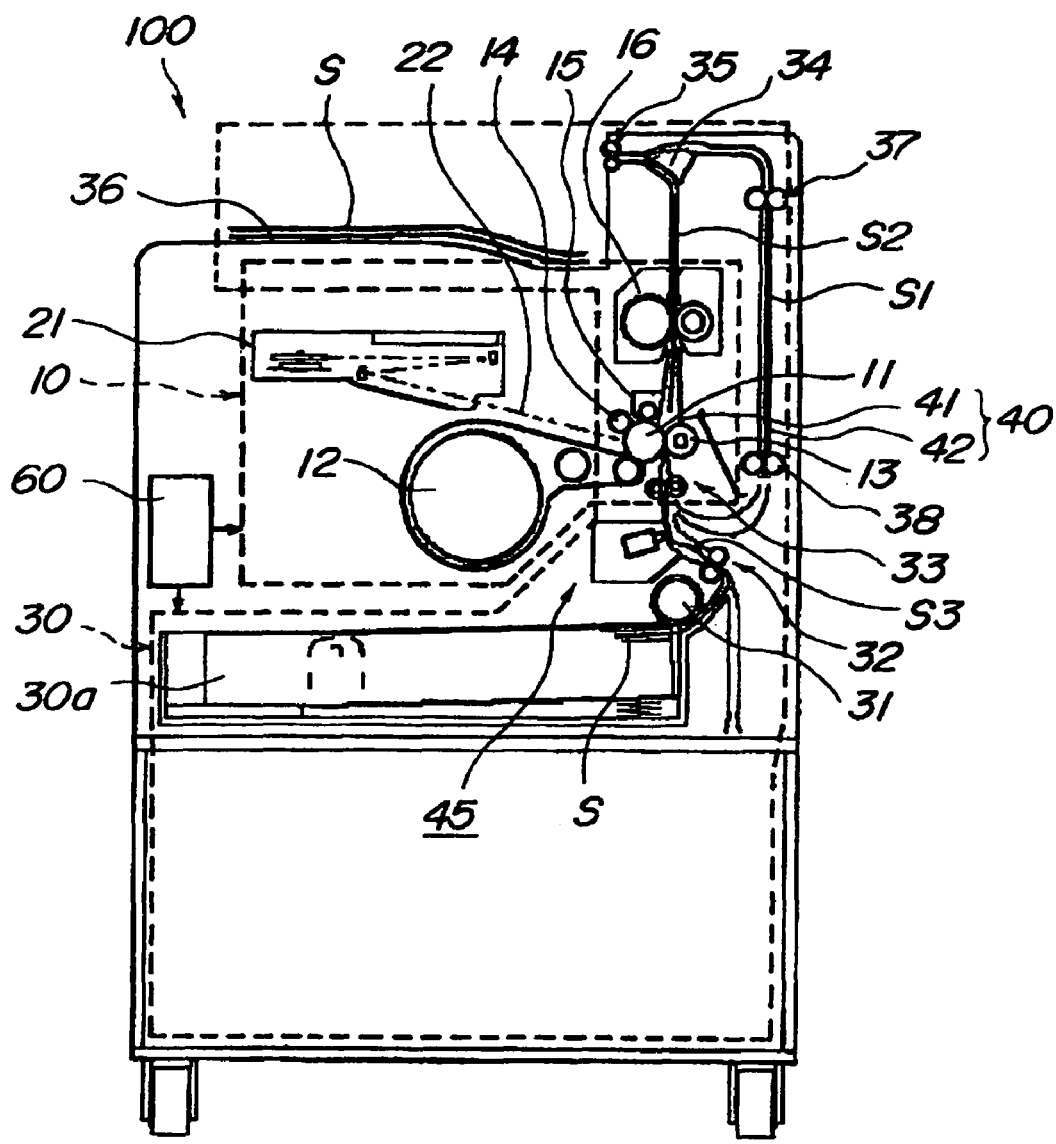
FIG. 1 is an overall view explaining an image forming apparatus 100.

First of all, explanation will be schematically made on an image forming apparatus 100. As shown in FIG. 1, the image forming apparatus 100 includes an image formation device 10, a sheet conveying apparatus 30, and a control device 60 such as a CPU which transmits a control signal to the image formation device 10 and the sheet conveying apparatus 30.

(Image Formation Device 10)

The image formation device 10 forms a toner image on a photosensitive drum 11 serving as an image bearing member by the effect of process means, and then, transfers the toner image onto a sheet material serving as a recording material, thereby fixing the toner image onto the sheet material so as to form an image.

The process means for forming the toner image on the photosensitive drum 11 include: charging means 14, which uniformly charges over the photosensitive drum 11; exposing means 21 such as a laser beam scanner, which forms an electrostatic latent image on the photosensitive drum 11; developing means 12, which supplies a toner serving as a developing agent to the electrostatic latent image, so as to form the toner image on the photosensitive drum 11; and cleaning means 15, which cleans a residual toner. In addition, the image formation device 10 is provided with transfer means 13 such as a transfer roller for transferring the toner image from the photosensitive drum 11, and fixing means 16 for heat-fixing the transferred toner image.

With this configuration, the image formation device 10 forms an image, as follows: namely, the electrostatic latent image is formed on the photosensitive drum 11 whose surface has been uniformly charged by the charging means 14, with a laser beam 22 emitted from the exposing means 21 in response to a digital image signal. Subsequently, the toner is supplied to the electrostatic latent image from the developing means 12, so that the toner image is formed on the photosensitive drum 11.

The toner image formed on the photosensitive drum 11 is attracted toward the transfer means 13, to which a voltage has been applied, in synchronism with the arrival at a transfer portion, at which the transfer means 13 and the photosensitive drum 11 face to each other, of a sheet material S, which has been conveyed by the sheet conveying apparatus 30, described later. Consequently, the toner image is transferred onto the sheet material S.

The sheet material S having the toner image transferred thereonto is conveyed into the fixing means 16 by the sheet conveying apparatus 30. Pressure or heat is applied to the sheet material S and the toner image in the fixing means 16, so that the toner image is fixed to the sheet material S. Consequently, the toner image is formed on the sheet material S.

In the meantime, the cleaning means 15 removes a residual toner from the surface of the photosensitive drum 11 after the toner image is transferred onto the sheet material S. Thereafter, the charging means 14 uniformly charges the photosensitive drum 11 again in the preparation for a subsequent image forming operation.

(Sheet Conveying Device 30)

The sheet conveying apparatus 30 is adapted to convey the sheet materials S stacked inside of a cassette 30a on a conveyance path 40 (including a normal conveyance path 41 and another conveyance path 42 for reversing the sheet material) in response to a control signal. Conveying means for conveying the sheet material S include a feed roller 31 for feeding and conveying the sheet material S from the cassette 30a, a conveyance roller pair 32 for conveying the sheet material S downstream of the feed roller 31, a registration roller pair 33 for conveying the sheet material S to the transfer portion at a predetermined timing while correcting skew of the sheet material, a discharge roller pair 35 for discharging the sheet material S outward of the apparatus, a flapper 34 for changing a conveyance direction, and other conveyance roller pairs 37 and 38 disposed on a sheet re-feeding path for use in sheet re-feeding.

With this configuration, the sheet material S is conveyed by the feed roller 31, the conveyance roller pair 32 and the registration roller pair 33. Subsequently, the sheet material S is conveyed to the transfer portion as a nip portion defined between the photosensitive drum 11 and the transfer means 13 by the registration roller pair 33 which is driven at a predetermined timing in response to a control signal output from the control device 60. The sheet material S is conveyed to the discharge roller pair 35 by the flapper 34 after passing through the fixing means 16 disposed inside of the conveyance path.

Here, the sheet material S is discharged onto a discharge tray 36 disposed outside of the apparatus as it is while the discharge roller pair 35 is rotated forward at the time of one-side image formation. In contrast, at the time of both-side image formation, the flapper 34 first guides the sheet material S toward the discharge roller pair 35 in the same manner as described above, and then, the discharge roller pair 35 is reversely rotated when the rear end of the sheet material S passes through the flapper 34. Simultaneously with this, the sheet material S is conveyed to the conveyance path 42 by switching a conveyance guide direction of the flapper 34. The sheet material S on the conveyance path 42 is conveyed downward by the conveyance roller pair 37, and then, is stopped in the state in which the leading end thereof is nipped by the conveyance roller pair 38 in order to take a timing (in a state of a sheet material S1 in FIG. 1).

Here, sheet materials S2 and S3, which have been subsequently conveyed from the conveyance roller pair 32, are conveyed along the same path as that in the case of the sheet material S1 for the purpose of image formation on either side. Thereafter, the conveyance roller pair 38 is driven again, so that the sheet material S1 is conveyed again to the registration roller pair 33 subsequent to the conveyance path 41. During this process, the front and back sides of the sheet material S1 are turned over. Thus, an image is formed also on the back side of the sheet material S1, and then, the sheet material S1 is discharged onto the discharge tray 36 through the discharge roller pair 35.

(Sheet Material S)

Figure 3A:
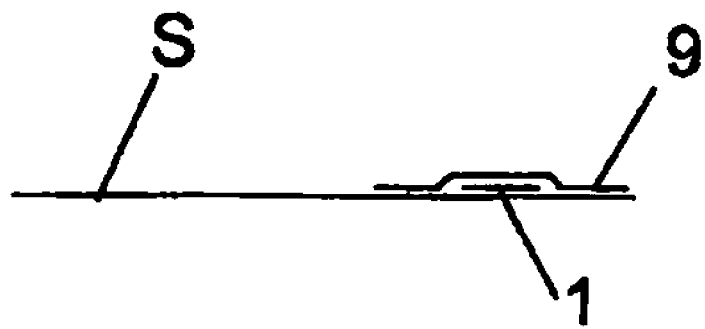
FIGS. 3A and 3B are views showing a sheet material S having an RFID tag 1 attached thereto.
Figure 3B:
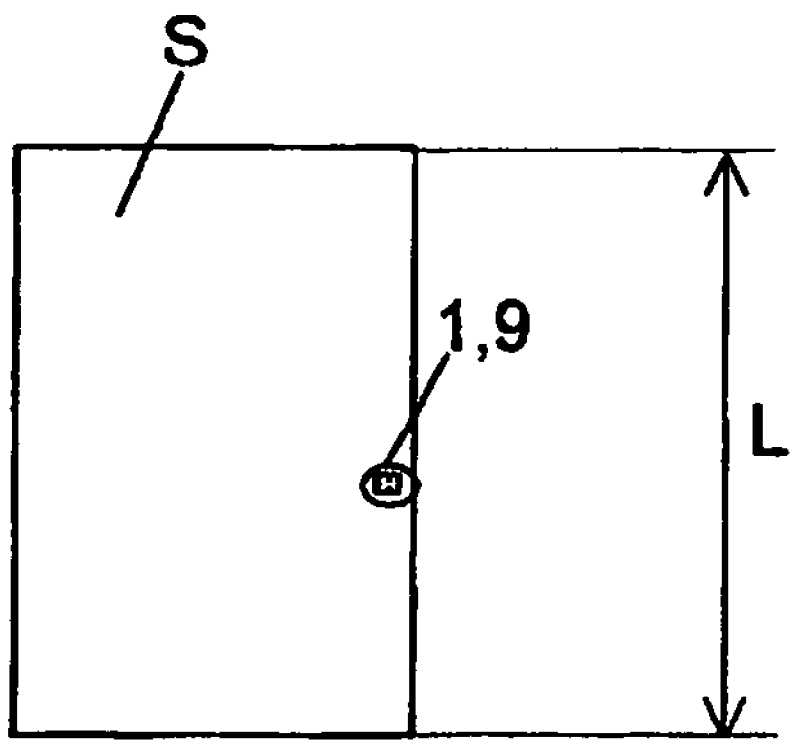

Next, explanation will be made on the sheet material S having an RFID tag attached thereto, for use in the image forming apparatus 100 of the present embodiment. FIGS. 3A and 3B are views showing the sheet material S having an RFID tag attached thereto.

As illustrated in FIGS. 3A and 3B, an RFID tag 1 is attached at a predetermined position at an edge of one side of the sheet material S. The RFID tag 1 is attached to the sheet material S with a sheet-like seal member 9 as a non-conductive base material such as a resin. The seal member 9 is made of the base material which is excellent in heat resistance and heat insulation property. The RFID tag 1 is attached to the sheet material S by using the above-described seal member 9, so that the seal member 9 per se prevent the performance of the RFID tag 1 from degrading even with the application of heat or pressure from the fixing means 16, and further, can protect the RFID tag 1 at the same time.

Incidentally, there are many types of sheet materials S for use in the image formation. An image can be properly formed by adjusting a current quantity to be applied to the transfer means 13 or the like according to the types of sheet materials S. In the present embodiment, data such as the type, thickness and electric resistance of sheet material S, which has been previously stored in the RFID tag 1, is precisely transmitted to the main body of the image forming apparatus 100. As a result, an image can be properly formed. Additionally, it is possible to find as to which image forming apparatus 100 forms the image by writing individual information on the image forming apparatus 100 in the RFID tag 1 at the same time.

(RFID Tag 1)

Figure 4:
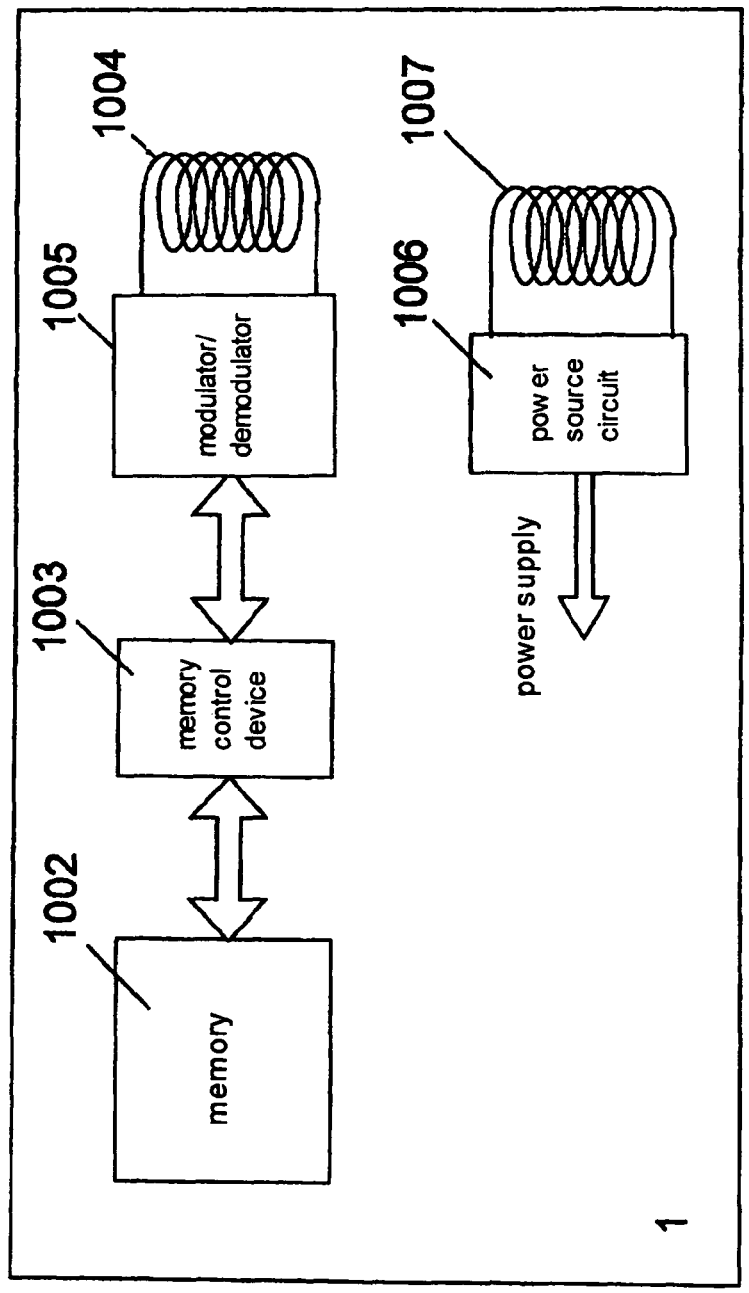
FIG. 4 is a diagram illustrating the configuration of the RFID tag 1.

Next, explanation will be schematically made on the configuration and operation of the RFID tag 1. FIG. 4 is a diagram illustrating the configuration of the RFID tag 1.

As illustrated in FIG. 4, the RFID tag 1 includes a memory 1002 for storing data therein such as an EEPROM, in which data is not erased even if a power source is turned off. The memory 1002 has an address in accordance with a capacity, wherein a data storage of 16 bits is constituted per address. A memory control device 1003 is adapted to read or write data, which is transmitted from a coil 1004, in the memory 1002 in accordance with a command sent from the reader/writer via a modulator/demodulator 1005.

The memory control device 1003 controls a reading or writing control with respect to the memory 1002 in accordance with the command sent from the modulator/demodulator 1005.

A power source circuit 1006 is adapted to supply electric power to a circuit in the RFID tag 1 by the effect of an induced electromotive force generated in a coil 1007 by electromagnetic induction from the outside. The configuration illustrated in FIG. 4 is integrated in a one-chip IC in the RFID tag 1.

Figure 5A:
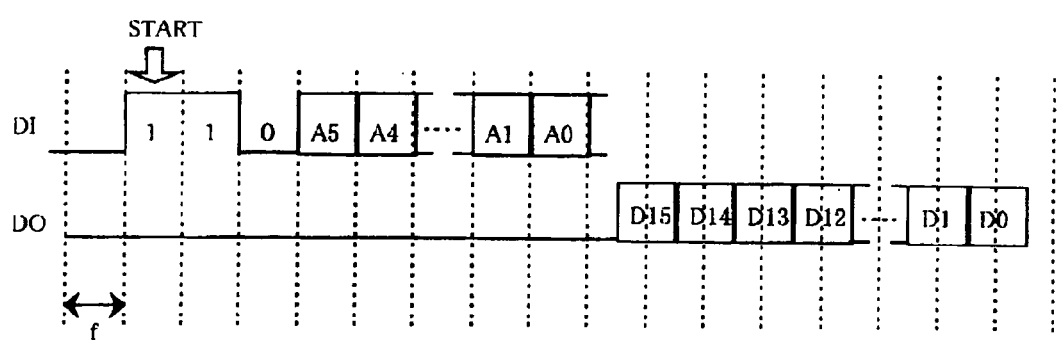
FIGS. 5A and 5B are charts illustrating examples of a reading/writing control in a memory 1002.
Figure 5B:
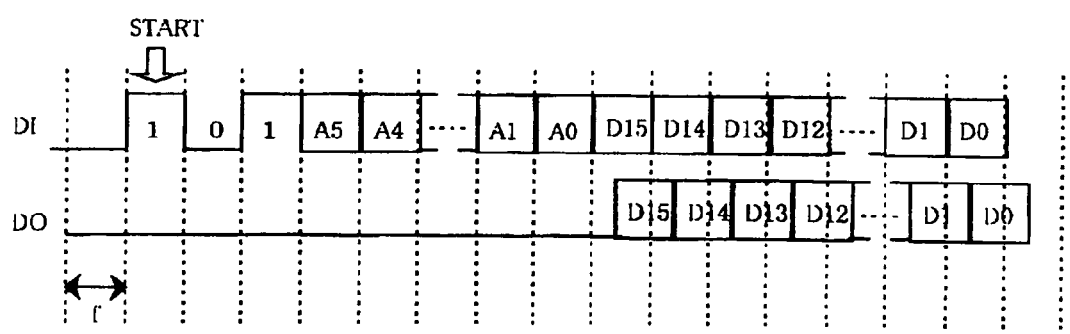

A description will be given below of a data format to be sent from the modulator/demodulator 1005 in reference to FIGS. 5 and 6. FIGS. 5A and 5B are charts illustrating examples of a reading/writing control in the memory 1002, which is a control substantially equivalent to a general control by an EEPROM, FIG. 5A illustrates a data format in the reading control and FIG. 5B illustrates a data format in the writing control. In addition, FIG. 6 is a table illustrating an example of a control mode of the RFID tag.

First of all, when a power transmission wave is sent from a reading/writing circuit, not illustrated but described later, the power transmission wave is received by the coil 1007 illustrated in FIG. 4, so that the induced electromotive force is generated in the power source circuit 1006. When the electric power is supplied to the RFID tag 1 by the effect of the induced electromotive force, the memory control device 1003 monitors serial data DI received from the coil 1004 via the modulator/demodulator 1005, thereby detecting the transition of a bit from 0 to 1.

As illustrated in FIG. 5A, command data takes 1 and 0 during the reading control. This signifies a reading command, as illustrated at an upper row in the table of FIG. 6. The memory control device 1003, which has received the reading command, controls the memory 1002 in a reading mode. In turn, the memory 1002 transmits, to the memory control device 1003, data stored in an address expressed as 6-bit data subsequent to the command data as serial data DO. Thereafter, the memory control device 1003 sends a modulated wave to a data writing circuit, not illustrated, from the coil 1004 via the modulator/demodulator 1005.

As illustrated in FIG. 5B, command data of two bits subsequent to a start bit takes 0 and 1 during a writing control. This signifies a writing command, as illustrated in FIG. 6. The memory control device 1003, which has received the writing command, controls the memory 1002 in a writing mode. 16-bit data immediately subsequent to the command data is written in an address expressed as 6-bit data subsequent to the command data. In FIG. 5B, the data written in the serial data DO at the same time as the writing control is transmitted to the memory control device 1003. Thereafter, the memory control device 1003 sends the modulated wave to a data writing unit, not illustrated, from the coil 1004 via the modulator/demodulator 1005. As a consequence, the reading/writing circuit can determine as to whether or not the transmitted data is properly written.

(Reading/Writing Circuit)

Figure 7:
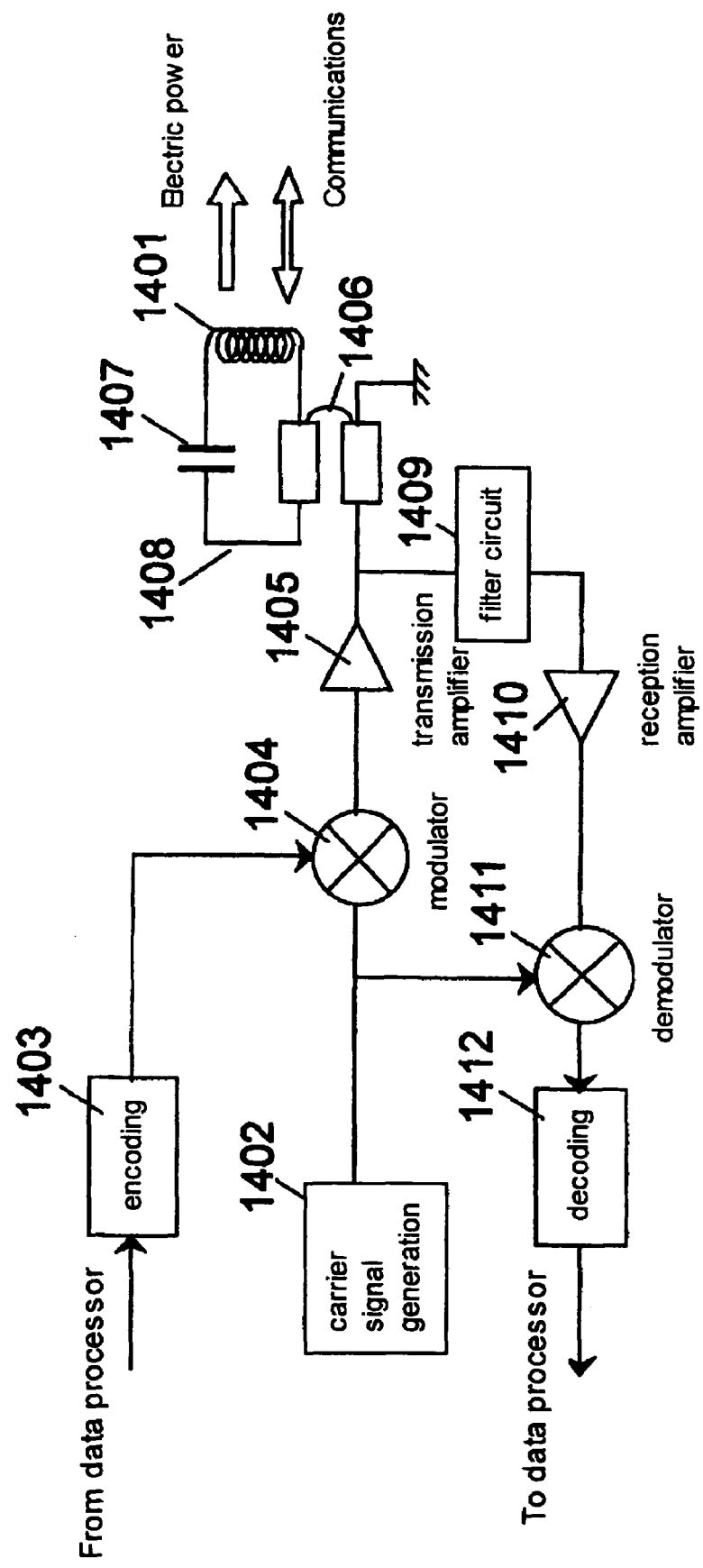
FIG. 7 is a diagram illustrating the configuration of a reading/writing circuit.

Subsequently, the reading/writing circuit disposed in a reader/writer 2, described later, will be explained in reference to FIGS. 7 and 8. FIG. 7 is a diagram illustrating the configuration of the reading/writing circuit, and FIG. 8 is a graph schematically illustrating a carrier wave generated by the reading/writing circuit.

Figure 8:
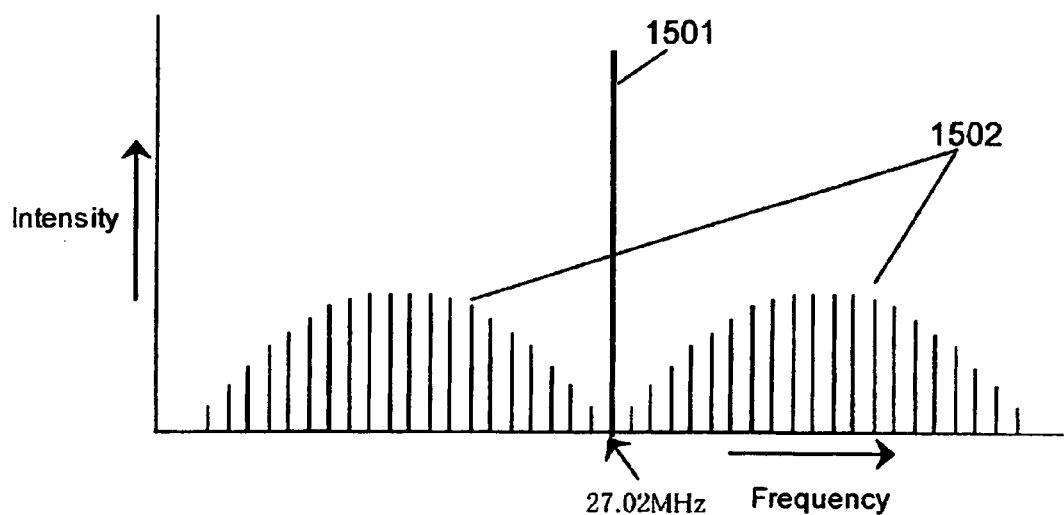
FIG. 8 is a graph schematically illustrating a carrier wave generated by the reading/writing circuit.

Both of the transmission of electric power and the transmission or reception of communications are achieved between an R/W coil (a reader or/and writer coil) 1401 disposed in the reading/writing circuit and the coil 1004 formed in the RFID tag 1 illustrated in FIG. 4 by the use of an electromagnetic wave (a radio wave) consisting of the power transmission wave illustrated in FIG. 8 and a data communication modulated wave. Here, there arises no problem even if the power transmission wave and a signal wave are sent by antennas independent of each other.

As illustrated in FIG. 8, the coil 1007 illustrated in FIG. 4 receives a power transmission wave 1501 of 27.02 MHz, thereby supplying the electric power for driving the RFID tag 1. In contrast, the coil 1004 illustrated in FIG. 4 sends or receives a data communication modulated wave 1502 having a center frequency of 27.02 MHz, thereby performing a reading/writing access to the memory 1002 in the RFID tag 1.

In FIG. 7, the reading/writing circuit includes: an encoding circuit 1403, which encodes a carrier signal of 27.02 MHz generated in a carrier signal generating circuit 1402 into data to be transmitted to the RFID tag 1; a modulator 1404, which superimposes the encoded signal in the encoding circuit 1403 on a drive signal of 27.02 MHz by an amplitude shift keying (abbreviated as "ASK") modulation; a transmission amplifier 1405, which amplifies the ASK-modulated signal on the drive signal of 27.02 MHz by the modulator 1404; and a matching circuit (a power supplying circuit) 1408, which combines the amplified signal in the transmission amplifier 1405 by the effect of inductance combination 1406 and includes a capacitor 1407 for matching an impedance, so as to prevent any reflection.

Additionally, the reading/writing circuit includes: the coil (the reader or/and writer coil) 1401, which generates the electromagnetic wave so as to transmit the electric power and the data in accordance with an output from the matching circuit 1408, and further, receives the data transmitted from the coil 1004 in the RFID tag 1 by the electromagnetic wave; a filter circuit 1409, which matches the signal received by the coil (the reader or/and writer coil) 1401 by the matching circuit 1408, so as to remove a noise component from a signal produced by the inductance combination 1406; a reception amplifier 1410, which amplifies a signal obtained through the filter circuit 1409; a demodulator 1411, which demodulates the signal amplified in the reception amplifier 1410 by the use of the drive signal of 27.02 MHz; and a decoding circuit 1412, which decodes the signal demodulated in the demodulator 1411, so as to output it as reception data.

The reading/writing circuit such configured as described above transmits the transmitted data to be transmitted from a data processor, not illustrated, from the coil 1401 after the AKD modulation, or receives AKD-modulated data received from the coil 1401.

(Configuration of Tag Recognizer 45 in RFID Tag 1)

A detailed description will be given below of the tag recognizer 45 in the RFID tag 1 as a feature in the present embodiment in reference to FIGS. 2A to 2D. FIGS. 2A to 2D are views showing the detailed configuration of the tag recognizer 45. Flows of the sheet materials S (S1 to S3) will be explained in reference to FIGS. 2A to 2D.

As shown in FIGS. 2A to 2D, the tag recognizer 45 in the present embodiment includes: the reader/writer (a communication device) 2 having a communicator 2a, which is controlled in response to an electric signal output from the control device 60 so as to read and write information on the RFID tag 1; a shield box (a communication range restricting member) 4 disposed around the reader/writer 2; a conveyance path 43 consisting of a conveyance guide 6 and another conveyance guide 8 which are disposed opposite to a communicator (transmitter/receiver) 2a in the reader/writer 2; and a sheet sensor (a sheet material detector) 39 disposed immediately upstream of the registration roller pair 33 disposed most downstream of the conveyance path 43. Here, the conveyance guide 6 on the conveyance path 43 is disposed near the communicator 2a while the conveyance guide 8 on the conveyance path 43 is disposed remotely from the communicator 2a.

The conveyance path 43 is located upstream side of the registration roller pair 33, which is disposed on the conveyance path 41, in the sheet material conveyance direction, to thus guide the sheet material conveyed through the conveyance roller pair 32 to the registration roller pair 33. The conveyance path 43 is bent, as shown in FIGS. 2A to 2D. Specifically, the conveyance path 43 is bent in such a manner as to gradually approach the reader/writer 2 from the conveyance roller pair 32 and is closest to the reader/writer 2 at a position, at which the conveyance path 43 faces to the communicator 2a in a communication direction. With such a shape, the RFID tag 1 attached onto the sheet material S gradually approaches the position near the communicator 2a from the position remote from the communicator 2a during the conveyance of the sheet material S, and then, the RFID tag 1 most approaches the communicator 2a at the position, at which the RFID tag 1 faces to the communicator 2a. As a consequence, the communicator 2a is configured in such a manner as to most readily communicate with the RFID tag 1 at the position, at which the RFID tag 1 faces to the communicator 2a.

The shield box 4 is constituted of a conductive member having an opening formed only at a surface of the communicator 2a in the reader/writer 2, which faces to the conveyance path 43, and particularly in the present embodiment, is made of iron as a magnetic metal member. Moreover, the shield box 4 shields the reader/writer 2 at least in two directions opposite to each other in a direction different from the communication direction of the communicator 2a. In this way, since the shield box 4 is constituted of the magnetic metal member except in the communication direction of the communicator 2a, the electromagnetic induction can be degraded in the directions other than the communication direction of the communicator 2a, thereby more securely achieving the communications with the RFID tag 1 in the direction, in which the RFID tag 1 faces to the communicator 2a. In addition, the orientation of the reader/writer 2 can be limited.

Furthermore, for example, a partition plate constituted of a part of the shield box 4 or another conductive member is interposed between the reader/writer 2 and the cassette (a sheet material container) 30a, thereby preventing any communications with an RFID tag attached onto a sheet material S stacked inside of the cassette 30a.

Moreover, the entire surface of the shield box 4 is subjected to a rust-proofing coating treatment. Such rust-proofing processing can achieve long-term endurance of characteristics of a magnetic metal for degrading the electromagnetic induction, thereby achieving stable communications for a long time.

A part of the conveyance guide 6 and the conveyance guide 8 facing to the communicator 2a on the conveyance path 43 within a Maximum (greatest) communicable distance A or all of the conveyance guide 6 and the conveyance guide 8 is particularly constituted of a non-conductive mold component made of a resin or the like. In this manner, at least a part within the maximum communicable distance A is constituted of a non-conductive member, thereby avoiding any adverse influence on the communications between the RFID tag 1 and the reader/writer 2, so as to achieve the stable communications.

Incidentally, a portion of the conveyance path 43 except for the maximum communicable distance A may be constituted of a conductive member. With this constitution, the electromagnetic induction is degraded at the portion except for the maximum communicable distance A, so that the communicator 2a can certainly communicate with the RFID tag 1 within the maximum communicable distance A.

A conveyance guide 3 is located under the conveyance path 42 and serves as a confluence to the other conveyance path 41. The conveyance guide 3 is made of a press part obtained by subjecting a magnetic metal plate to coating with a resin having a high slidability with respect to the sheet material. A part of the conveyance guide 3 is made of a conductive member, which can degrade the electromagnetic induction at that portion. Thus, the magnetic metal plate of the conveyance guide 3 restricts the communications in the communication direction of the communicator 2a in the reader/writer 2, so as to suppress the communications with the RFID tag 1 attached onto the sheet material S on the conveyance path 42.

A magnetic metal plate 7 is interposed between the communicator 2a in the reader/writer 2 and the conveyance roller pair 38. Here, for the same reason as described above, the magnetic metal plate 7 is subjected to a rust-proofing coating treatment.

As described above, in the present embodiment, the conveyance guides 6 and 8 at the positions, at which the communications are performed with the reader/writer 2, are made of the non-conductive member such as the resin: in contrast, the position, at which no communications are performed with the reader/writer 2, for example, the conveyance guide 3 on the conveyance path 42 is made of the magnetic metal member. Consequently, the reader/writer 2 readily performs the communications with the RFID tag 1 on the conveyance path 43, and further, the reader/writer 2 can prevent any communications with the RFID tag 1 on the conveyance path 42.

In addition, the magnetic metal plate 7 made of the magnetic metal or the conveyance path 42 is disposed in the direction of the communicator 2a in the reader/writer 2, thereby degrading the electromagnetic induction, and further, preventing any radiation (a radiation noise) of the electromagnetic wave for use in the communications to the outside of the apparatus body.

As described above, the tag recognizer 45 and its surroundings are covered with the magnetic metal members such as the shield box 4, the conveyance guide 3 made of the magnetic metal and the magnetic metal plate 7. Here, the RFID tag 1 has a property such as the degradation of the electromagnetic induction as it approaches a position within about 15 mm from a magnetic metal member. Here, the communicator 2a in the reader/writer 2 can achieve the communications within a range in separation to the maximum of 0.3 m to the maximum in a space. However, the electromagnetic wave is shielded by the magnetic metal member, as described above, thereby limiting a communicable range by the communicator 2a. As a result, a communicable range 49 by the reader/writer 2 is provided downstream side in the sheet material conveyance direction beyond the conveyance roller pair 32 and upstream side in the sheet material conveyance direction beyond the confluence between the conveyance path 42 and the conveyance path 43 (shaded portions in FIGS. 2A to 2D) within the conveyance path 43.

(Procedures of Communications of Reader/Writer 2 with RFID Tag 1)

Figure 9:
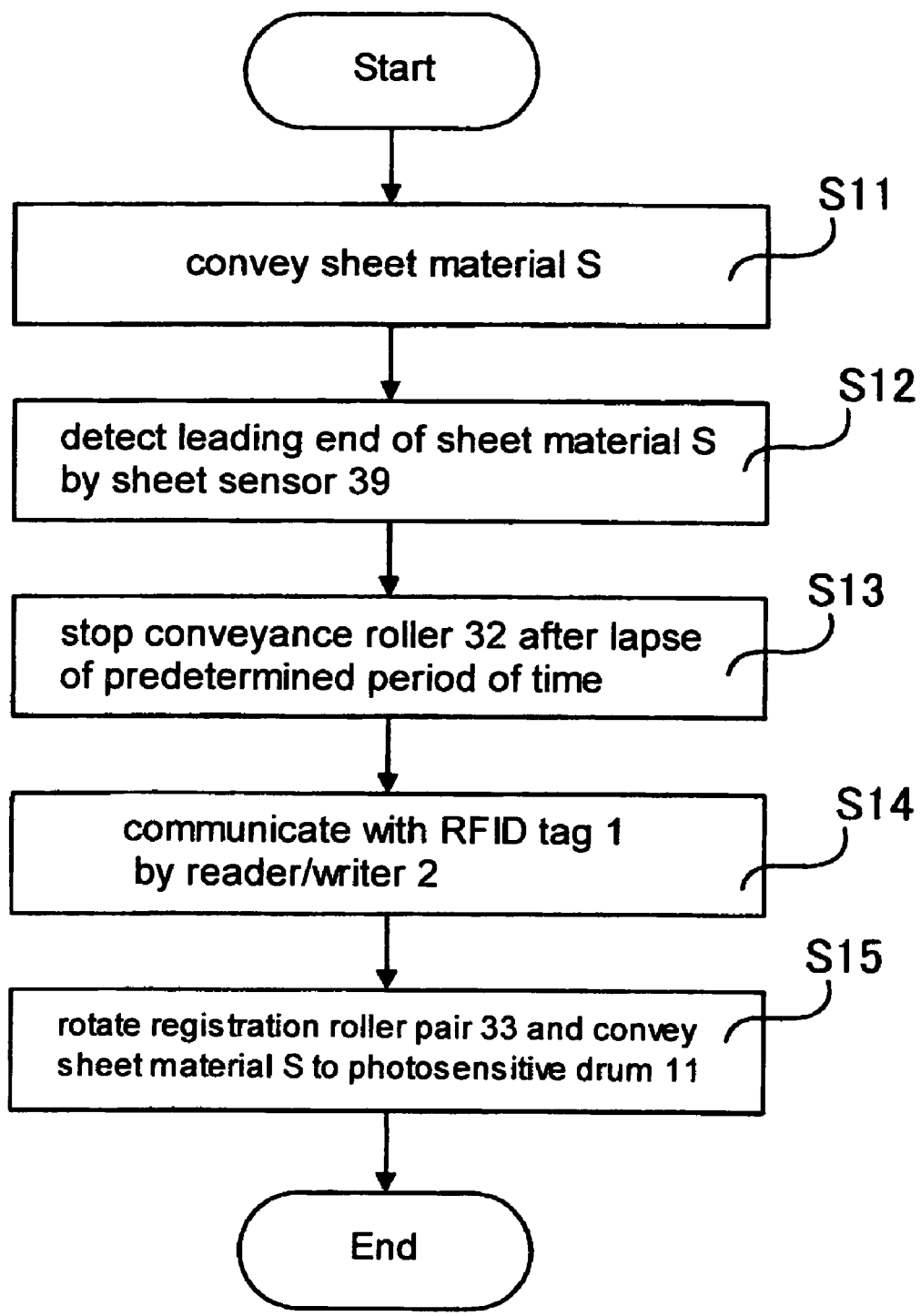
FIG. 9 is a flowchart illustrating communications with the RFID tag 1 according to the first embodiment.

Here, explanation will be made on procedures of the communications of the sheet conveying apparatus 30 with the RFID tag 1 attached onto the sheet material S in the present embodiment in reference to FIGS. 2A to 2D and 9. FIGS. 2B and 2D illustrate timings of the communications with the RFID tag attached onto the sheet material in the sheet conveying apparatus 30. FIG. 9 is a flowchart illustrating the communications with the RFID tag attached onto a single piece of sheet material in the first embodiment.

Figure 2A:
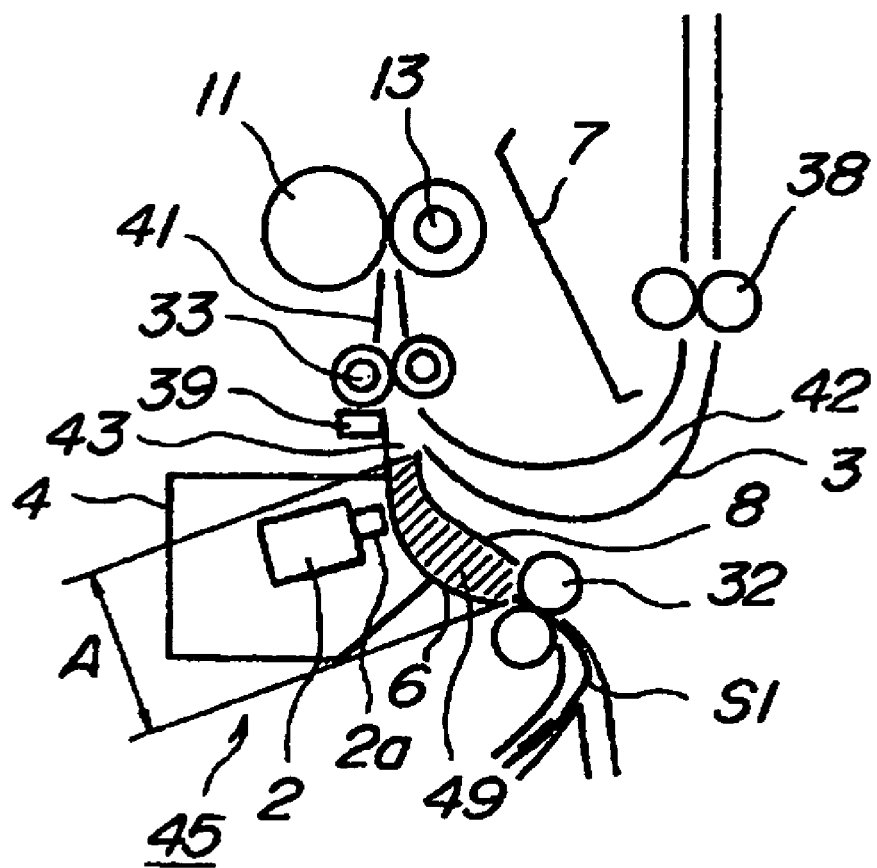
FIGS. 2A to 2D are views showing the detailed configuration of a tag recognizer 45 in a first embodiment.
Figure 2B:
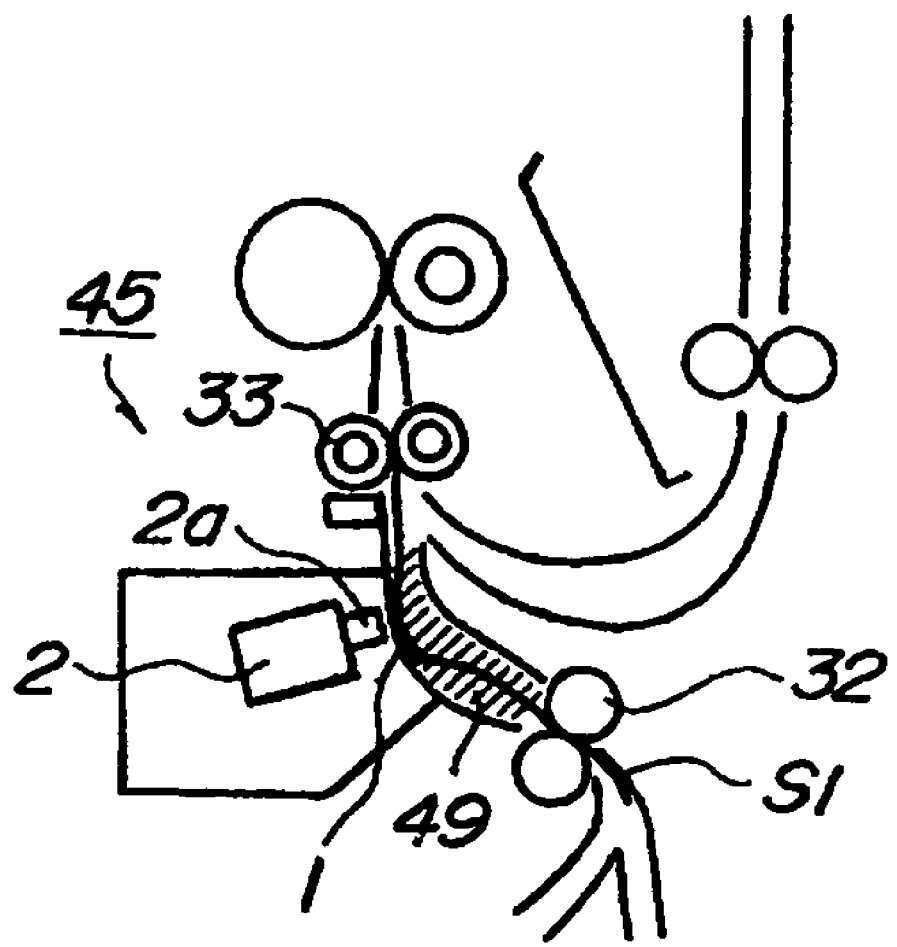

As shown in FIG. 2A, the sheet material S1 fed from the cassette 30a is conveyed onto the conveyance path 43 by the conveyance roller pair 32. When the sheet material S1 is conveyed (in S11 in FIG. 9), and then, the leading end of the sheet material S1 reaches a certain position at the sheet sensor 39, the sheet sensor 39 detects the leading end of the sheet material S (in S12 in FIG. 9).

The control device 60, which has received the detection signal output from the sheet sensor 39, stops the rotation of the conveyance roller pair 32 after a lapse of a predetermined period of time (for example, 100 ms) after the detection of the leading end of the sheet material by the sheet sensor 39. As a consequence, the sheet material S1 is stopped in a state in which its leading end abuts against the nip portion of the registration roller pair 33 (in S13 in FIG. 9).

In the state in which the leading end of the sheet material S1 abuts against the registration roller pair 33, the sheet material S1 is located along the conveyance guides 6 and 8 on the bent conveyance path 43, as shown in FIG. 2B. In this state, the RFID tag 1 attached onto the sheet material S1 is positioned within the communicable range 49 by the reader/writer 2, and further, the RFID tag 1 abuts against or approaches the side of the conveyance guide 6 facing to the communicator 2a. In this state, the communicator 2a in the reader/writer 2 communicates with the RFID tag 1 attached onto the sheet material S1 (in S14 in FIG. 9), thereby achieving secure communication with the RFID tag 1 of the sheet material S passing through the conveyance path 43. In addition, the RFID tag 1 attached onto the sheet material S1 also is stopped at a position, at which the RFID tag 1 faces to the communicator 2a of the reader/writer 2, by stopping the conveyance roller pair 32, resulting in the secure communications with the RFID tag 1.

After the reader/writer 2 communicates with the RFID tag 1 of the sheet material S1, the control device 60 issues such a command as to start the rotation and drive of the registration roller pair 33, the conveyance roller pair 32 and the like. Therefore, the sheet material S1 is conveyed toward the photosensitive drum 11 by the registration roller pair 33 (in S15 in FIG. 9).

Figure 2C:
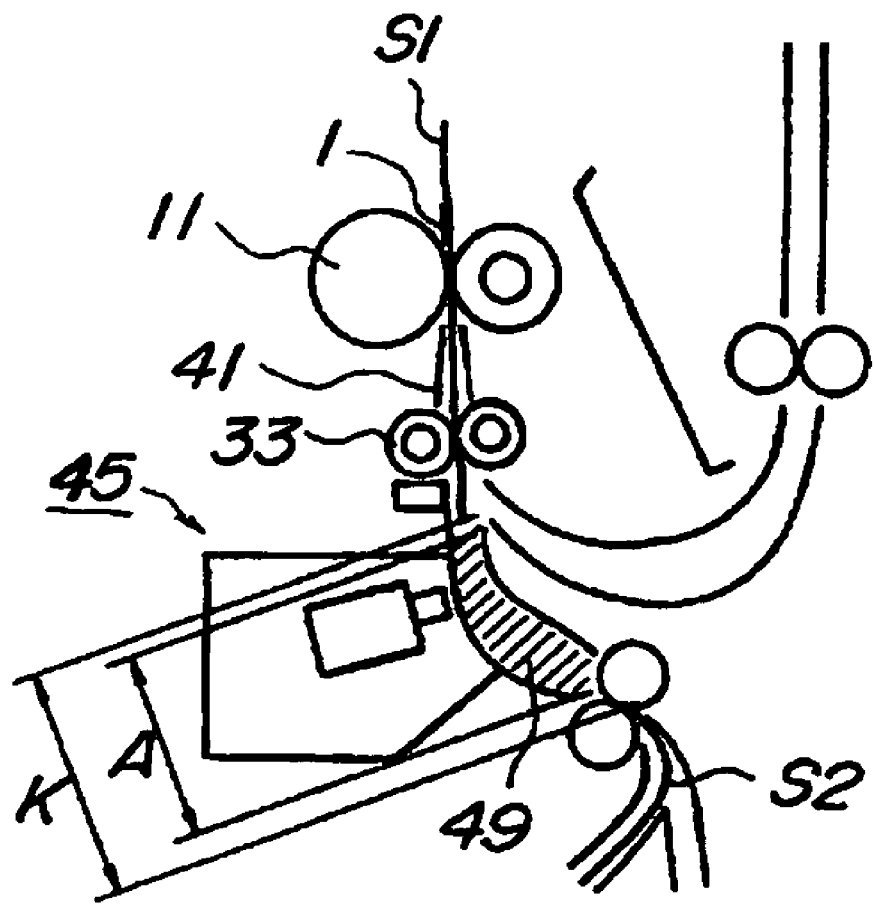
Figure 2D:
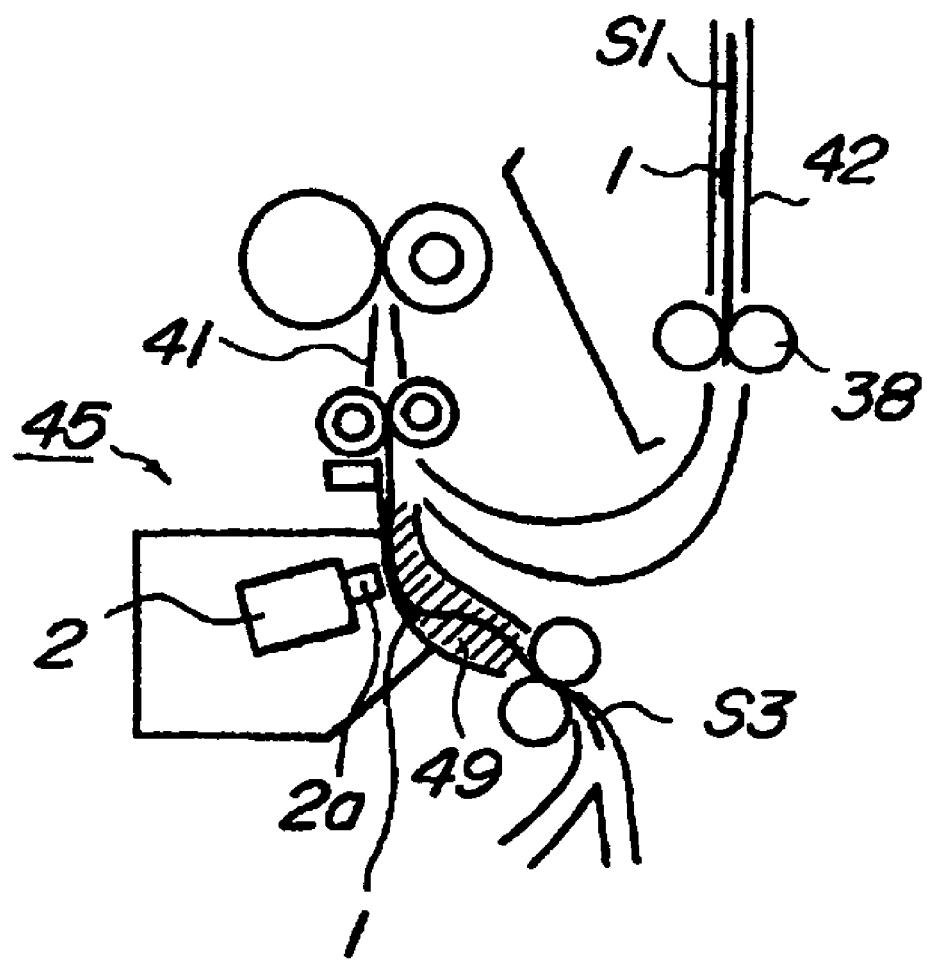

Next, if the sheet material conveying operation is continued, the sheet material S2 subsequent to the sheet material S1 is conveyed through the conveyance roller pair 32. Here, as shown in FIG. 2C, an interval K between the rear end of the preceding sheet material S1 and the leading end of the subsequently conveyed sheet material S2 is designed to be greater than the maximum communicable distance A, which is a distance in the sheet material conveyance direction within the communicable range 49. When the interval K is greater than the maximum communicable distance A, two RFID tags 1 cannot reach the maximum communicable distance A at the same time even if the RFID tag 1 is attached to an arbitrary portion of the sheet material S. Consequently, only one RFID tag 1 reaches the region of the communicable range 49 at all times, thereby preventing any simultaneous communications of the communicator 2a with a plurality of RFID tags 1. Thus, it is possible to avoid any situation in which the communications with both of the RFID tag 1 attached onto the sheet material S1 and the RFID tag 1 attached onto the sheet material S2 are performed at the same time.

Normally, the RFID tag 1 is attached at a predetermined position on the sheet material S in the sheet material conveyance direction (e.g., a position shown in FIG. 3B). In view of this, an interval between the RFID tags 1 conveyed in the apparatus is expressed by at least a sum (L+K) of a length L of the sheet material S in the conveyance direction (see FIG. 3B) and the conveyance interval K between the sheet materials S. Therefore, if the maximum communicable distance A within the communicable range 49 is set to be smaller than at least the distance (L+K), only one RFID tag 1 reaches within the communicable range 49 at all times, thereby preventing any simultaneous communications of the communicator 2a with the plurality of RFID tags 1 in the same manner as described above. For example, the maximum communicable distance A is set to be shorter than (148 mm+50 mm=198 mm) in the case where the length L of the sheet material S in the conveyance direction is 148 mm and the interval K between the sheet materials is 50 mm, thereby preventing any simultaneous communications with the RFID tags 1, so as to achieve the secure communications.

Like the RFID tag 1 of the sheet material S1, the RFID tag 1 of the sheet material S2 also is conveyed on the conveyance path 41 by the registration roller pair 33 after the communications with the communicator 2a. Thereafter, the leading end of the sheet material S3 conveyed subsequently to the sheet material S2 abuts against the nip portion of the registration roller pair 33, and the reader/writer 2 communicates with the RFID tag 1 in the state in which the conveyance roller pair 32 is stopped.

Here, as shown in FIG. 2D, the sheet material S1, which has been already conveyed, is stopped in the state in which the leading end of the sheet material S1 abuts against or is nipped by the conveyance roller pair 38 on the way of the conveyance path 42 in the case of the sheet re-conveying. Also in this case, the RFID tags 1 other than the RFID tag 1 of the sheet material S3 as a communication target (the respective RFID tags 1 of the sheet material S1 and the sheet material S2) are located out of the communicable range 49, and therefore, the reader/writer 2 cannot communicate with those RFID tags 1. Thus, the reader/writer 2 can communicate with only the RFID tag 1 of the sheet material S3.

Second Embodiment

Figure 10:
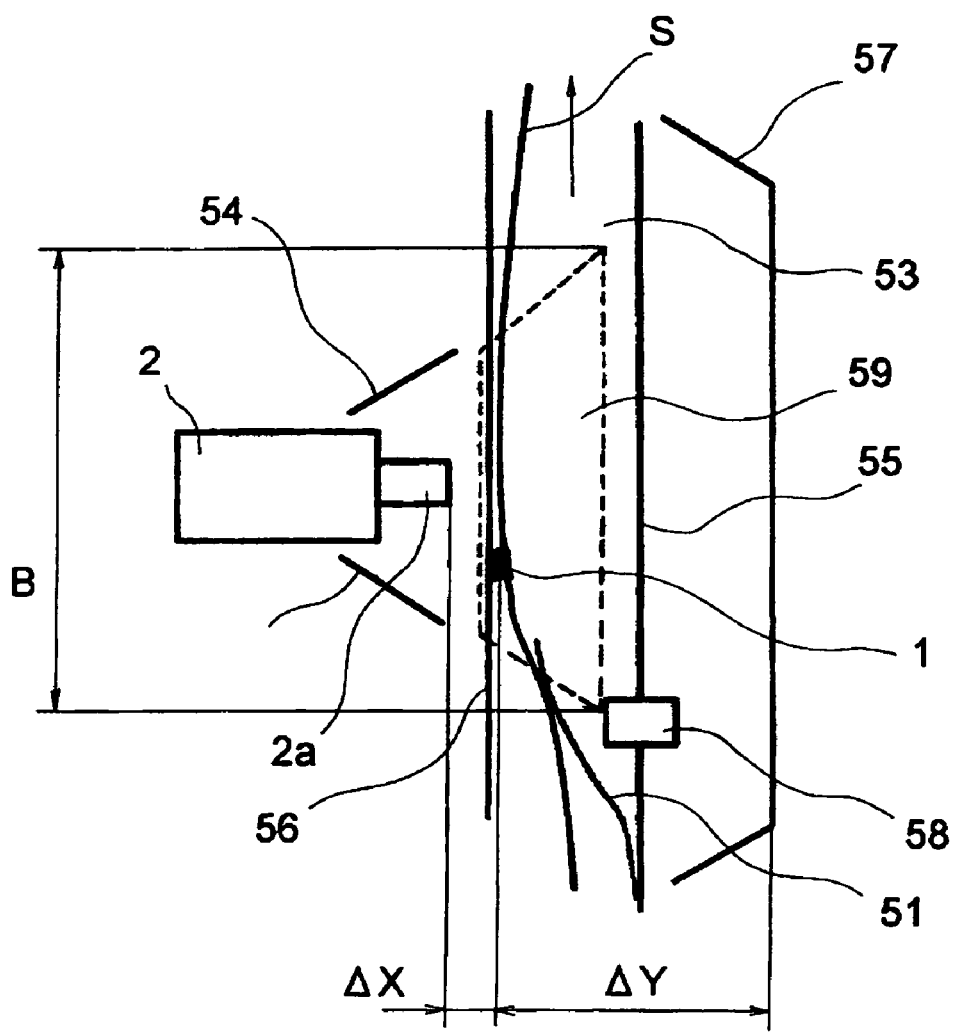
FIG. 10 is a view showing the detailed configuration of a tag recognizer 50 according to a second embodiment.

A second embodiment according to the present invention will be described in reference to the attached drawings. The same constituents as those in the above-described embodiment are designated by the same reference numerals, and therefore, the explanation will not be described. FIG. 10 is a view showing the detailed configuration of a tag recognizer 50.

(Configuration of Tag Recognizer 50 in RFID Tag 1)

As shown in FIG. 10, the tag recognizer 50 in the present embodiment includes: a reader/writer 2 having a communicator 2a; a magnetic metal plate (a communication range restricting member) 54 disposed around the communicator 2a in the reader/writer 2; a conveyance path 53 consisting of a conveyance guide 56 and another conveyance guide 55 which are disposed opposite to a communicator (transmitter/receiver) 2a in the reader/writer 2; another magnetic metal plate (another communication range restricting member) 57 disposed at a position, at which the magnetic metal plate 57 faces to the communicator 2a in the reader/writer 2 while nipping the conveyance path 53 therebetween; and a metal sensor (an RFID tag detector) 58, which detects that an RFID tag 1 of a sheet material S passes through. Here, the constituents other than the tag recognizer 50 are the same as those in the first embodiment. In particular, two readers/writers 2, each having a communicable range smaller than that of the reader/writer 2 in the first embodiment, are disposed in the vicinity of both ends perpendicular to a sheet material conveyance direction in such a manner that the communicable ranges do not overlap each other.

The magnetic metal plate 54 is a partition plate made of a conductive member, and particularly, a partition plate made of iron as a magnetic metal member in the present embodiment. The magnetic metal plate 54 partitions the surroundings of the communicator 2a in such a manner as to shield the reader/writer 2 in at least two directions opposite to each other in a direction different from the communication direction of the communicator 2a (upstream side in a sheet material conveyance direction and downstream side in the sheet material conveyance direction while nipping the reader/writer 2 therebetween). Moreover, the magnetic metal plate 54 is inversely tapered such that its opening becomes greater toward the conveyance path 53. As a consequence, a communicable range 59 by the reader/writer 2 (a range enclosed by a dotted line in FIG. 10) has a trapezoidal cross section, as illustrated in FIG. 10.

Incidentally, the entire length of the communicable range 59 in the sheet material conveyance direction is referred to as a maximum communicable distance B. At this time, like in the above-described embodiment, an interval K between the sheet materials S to be conveyed is greater than the maximum communicable distance B. With the above-described conveyance, only one RFID tag 1 reaches within the communicable range 59 at all times, thereby preventing any simultaneous communications of the communicator 2a with a plurality of RFID tags 1. Thus, the communicator 2a can securely communicate with the RFID tag 1 of the sheet material S passing through the conveyance path 53, thus avoiding any interference by an RFID tag 1 of a sheet material which is not a communication target.

The conveyance path 53 in the present embodiment is configured such that the sheet material S is conveyed linearly in a vertical direction. Here, the conveyance guide 56 on the conveyance path 53 is disposed nearer the communicator 2a: in contrast, the other conveyance guide 55 on the conveyance path 53 is disposed more remotely from the communicator 2a. Each of the conveyance guides 55 and 56 is made of a resin, that is, a non-conductive material.

In the conveyance guide 55, a guide member 51 is disposed upstream side of the communicator 2a in the reader/writer 2 in the sheet material conveyance direction. The guide member 51 consists of a non-conductive member having elasticity such as PET (abbreviating polyethylene terephthalate) or the like. The guide member 51 is configured such that the sheet material S conveyed on the conveyance path 53 gradually approaches the reader/writer 2, and further, is adapted to guide the sheet material S so as to most approach the reader/writer 2 at a position facing to the communicator 2a in a communication direction. With such a shape, the communicator 2a most readily communicates with the RFID tag 1 at the position facing to the communicator 2a. Moreover, since the guide member 51 has the elasticity, the guide member 51 can press the sheet material S in the direction of the reader/writer 2 while flexibly coping with various tenacities of leading ends of sheet materials S. As a consequence, the guide member 51 can guide the sheet material S with respect to the reader/writer 2 while securing the smooth conveyance according to the sheet material S.

The guide member 51 is designed to guide the sheet material S toward the reader/writer 2 in such a manner as to satisfy ΔX<ΔY, wherein ΔX designates a proximate distance between the reader/writer 2 and the RFID tag 1 of the sheet material S conveyed in a direction indicated by an arrow on the conveyance path 53 and ΔY denotes a distance between the reader/writer 2 and the magnetic metal plate 57.

(Procedures of Communications of Reader/Writer 2 with RFID Tag 1)

Figure 11:
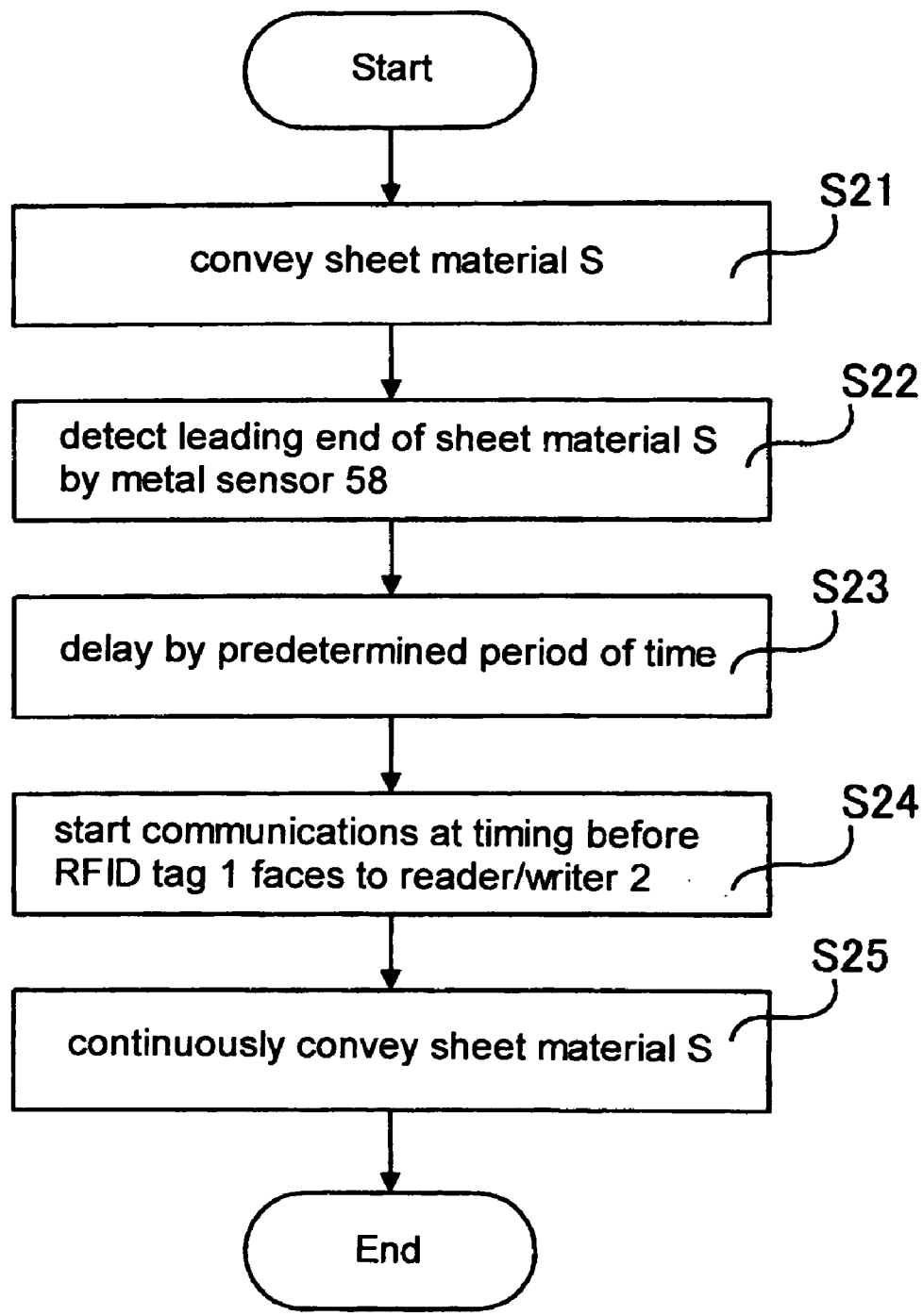
FIG. 11 is a flowchart illustrating communications with an RFID tag 1 according to the second embodiment.

Here, explanation will be made on procedures of the communications of a sheet conveying apparatus 30 with the RFID tag 1 attached onto the sheet material S in the present embodiment in reference to FIGS. 10 and 11. FIG. 11 is a flowchart illustrating the communications with the RFID tag attached onto a single piece of sheet material in the second embodiment.

First of all, the sheet material S is conveyed (in S21 in FIG. 11), and then, the RFID tag 1 of the sheet material S is detected by the metal sensor 58 (in S22 in FIG. 11). A control device 60, which has received a detection signal output from the metal sensor 58, transmits a control signal to the communicator 2a. After a lapse of a predetermined period of time (in S23 in FIG. 11), the control device 60 starts the communications with the RFID tag 1 at a timing when the RFID tag 1 passes a preceding position before the position proximate to the reader/writer 2 (in S24 in FIG. 11) by a predetermined distance (about 5 mm).

In the above-described manner, the guide member 51 detects the RFID tag 1, and then, the communicator 2a communicates with the RFID tag 1 after the lapse of the predetermined period of time (the timing before the RFID tag 1 faces to the communicator 2a). Thus, it is possible to stably perform the communications with the RFID tag 1 attached onto the sheet material S being conveyed.

Other Embodiments

Although the description has been given only of the sheet conveying apparatus 30 for the sheet material as the recording material in the image forming apparatus 100 in the above-described embodiments, the present invention is not limited to those embodiments. For example, the present invention may be applied to sheet material conveying means in an image reading apparatus for reading image data on an original.

In addition, although the explanation has been made only on the RFID tag which achieves the communications with the application of the electric current generated by the electromagnetic induction in the above-described embodiments, the present invention is not limited to those embodiments. For example, another frequency band such as a micro wave of 2.45 GHz may be used. Otherwise, an RFID tag incorporating a battery therein may be used.

Additionally, although the description has been given only of the communications with the RFID tag at the only one position in the sheet material conveyance direction in the above-described embodiments, the present invention is not limited to those embodiments. For example, a plurality of communication devices may be mounted in the sheet material conveyance direction.

CROSS-REFERENCE TO RELATED APPLICATION

This application claims the benefit of Japanese Patent Application No. 2005-111712 filed Apr. 8, 2005 which is hereby incorporated by reference herein in its entirety.

What is claimed is:

1. A sheet conveying apparatus comprising:
 a communication device, which performs communications with an RFID tag attached to a sheet material passing through a conveyance path; and a communication range restricting member, which restricts a communication range between the communication device and the RFID tag;

wherein the communication range restricting member comprises a shield box disposed around the communication device;

wherein the shield box comprises a conductive member having an opening formed at a surface of the communication device which faces to the conveyance path; and wherein a maximum communicable distance, which is a distance in a sheet material conveyance direction within the communication range between the communication device and the RFID tag, is smaller than an interval between each sheet material to be sequentially conveyed onto the conveyance path.

2. A sheet conveying apparatus according to claim 1, wherein the communication range restricting member is subjected to a rust-proofing processing.

3. A sheet conveying apparatus according to claim 1, wherein at least a part of the conveyance path within the maximum communicable distance is constituted of a non-conductive member.

4. A sheet conveying apparatus according to claim 1, wherein the conveyance path is bent into such a shape as to approach the communication device from upstream side to downstream side in the sheet material conveyance direction.

5. A sheet conveying apparatus according to claim 1, wherein the conveyance path includes a guide member, which guides in such a manner that the sheet material approaches the communication device during the conveyance of the sheet material.

6. A sheet conveying apparatus according to claim 5, wherein the guide member has elasticity.

7. A sheet conveying apparatus according to claim 1, further comprising:
a control device, which controls the conveyance of the sheet material,
wherein the control device stops the sheet material at a position, at which the RFID tag attached to the sheet material and the communication device face each other during the communications.

8. A sheet conveying apparatus according to claim 1, further comprising:
a sheet material detector,
wherein the communication device performs the communications with the RFID tag attached to the sheet material in response to a detection signal output from the sheet material detector.

9. A sheet conveying apparatus according to claim 1, further comprising:
an RFID tag detector,
wherein the communication device performs the communications with the RFID tag attached to the sheet material in response to a detection signal output from the RFID tag detector.

10. A sheet conveying apparatus according to claim 1, the sheet conveying apparatus being a device, which conveys a recording material serving as the sheet material.

11. A sheet conveying apparatus according to claim 1, wherein the sheet conveying apparatus is a device, which conveys an original sheet that serves as the sheet material.

12. An image forming apparatus comprising:
an image formation device; and
a sheet conveying device, which conveys a sheet material to the image formation device through a conveyance path;
a communication device, which performs communications with an RFID tag attached to a sheet material passing through a conveyance path; and
a communication range restricting member, which restricts a communication range between the communication device and the RFID tag;
wherein the communication range restricting member comprises a shield box disposed around the communication device;
wherein the shield box comprises a conductive member having an opening formed at a surface of the communication device which faces to the conveyance path; and
wherein the maximum communicable distance, which is a distance in a sheet material conveyance direction within the communication range between the communication device and the RFID tag, is smaller than an interval between each sheet material to be sequentially conveyed onto the conveyance path.

* * * * *